Oct. 11, 1932.     S. N. BUCHANAN     1,881,998
FIXTURE SUPPORT
Filed Aug. 9, 1929     2 Sheets-Sheet 1
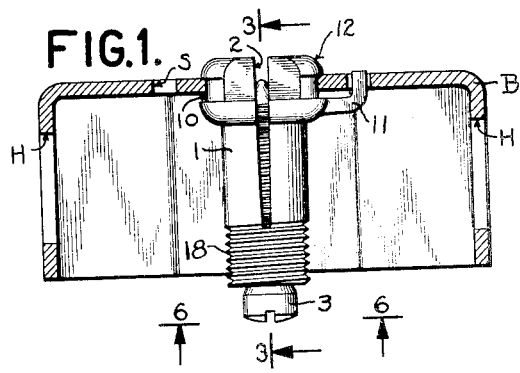
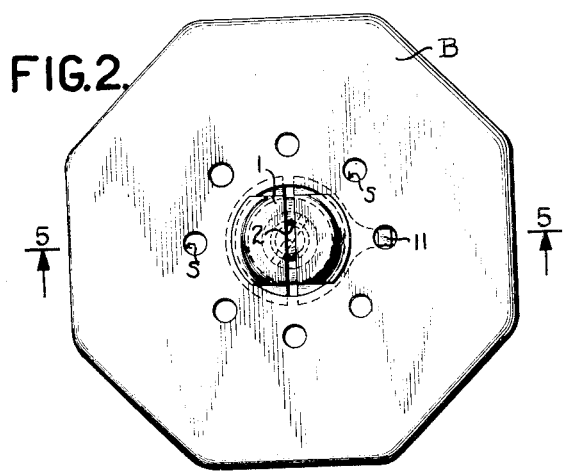
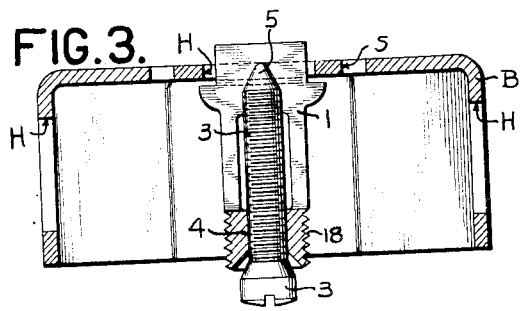
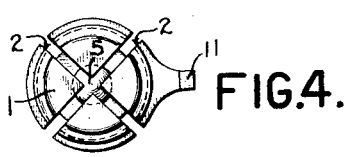
Inventor
STEPHEN N. BUCHANAN
By his Attorneys
Bohleber + Ledbetter

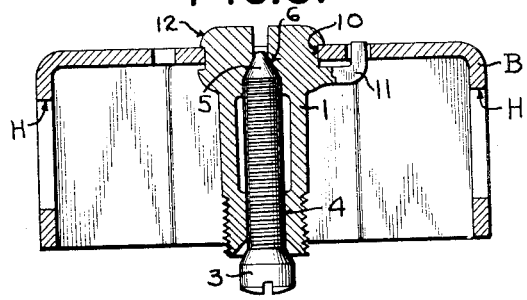
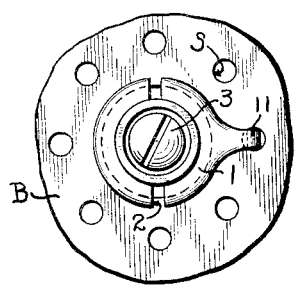
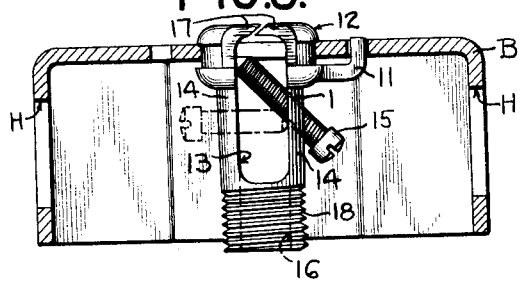
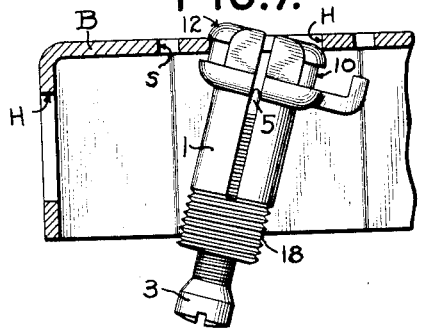
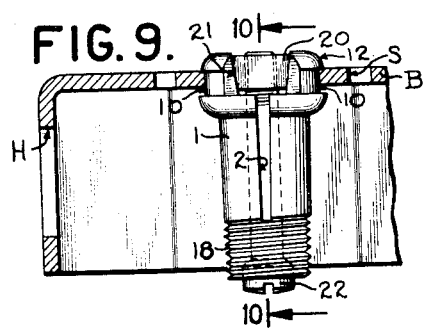
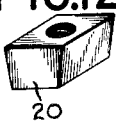
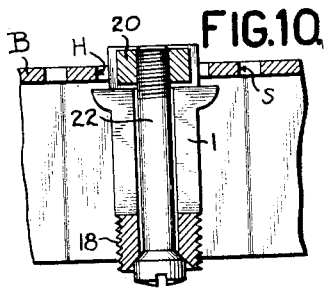
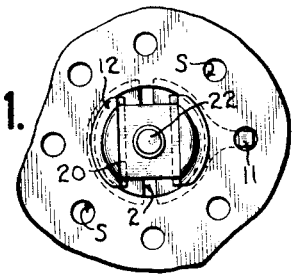
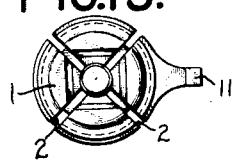

Patented Oct. 11, 1932

1,881,998

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

FIXTURE SUPPORT

Application filed August 9, 1929. Serial No. 384,585.

This invention relates to fixture supports which serve as an attaching device for a lighting fixture which is to be suspended from an outlet box secured to the ceiling. The outlet box serves as a terminal point for electrical house wiring and also serves as a support for a lighting fixture which is secured to the outlet box by means of the fixture support. The fixture support must therefore be firmly anchored to the box in order to securely support the weight of the lighting fixture. In addition the fixture support must be easily insertable within the outlet box after the outlet box has been secured in position in the ceiling or wall and in accomplishing these two results the fixture support of this invention is constructed so that it may be expanded into a box hole provided in the outlet box for the purpose of receiving the support.
It is an object of this invention to provide a fixture support which is expansible so that it may readily be inserted within a box hole provided therefor in an outlet box and expanded and locked therein in order to securely anchor it to the outlet box.

It is another object of this invention to provide various methods or means for securing and anchoring an expansible fixture support within the box hole provided therefor in the outlet box.

Other objects of the invention will be more apparent from the following detailed description taken in connection with the accompanying drawings, in which:—

Figure 1 shows an outlet box in section with the expansible fixture support expanded within a knockout hole in the box.

Figure 2 is a top view of the box of Figure 1 with the fixture support expanded within the box hole.

Figure 3 is a section on the line 3—3 of Figure 1 of the fixture support and outlet box with the fixture support mounted in a box hole.

Figure 4 shows the fixture support split longitudinally by two slots dividing the end of the fixture support into four expansible arms.

Figure 5 is a sectional view of the outlet box and fixture support taken on line 5—5 of Figure 2 showing the manner in which the fixture support is expanded.

Figure 6 shows the fixture support mounted upon the outlet box as viewed from the inside of the box.

Figure 7 shows a section of the outlet box and the position of the fixture support preparatory to its insertion within the box hole provided for its reception.

Figure 8 shows a modified form of the fixture support in which a modified form of expanding means is provided for locking the fixture support within a box hole.

Figure 9 shows another modified form of expanding means for expanding the fixture support within the box hole opening provided for its reception.

Figure 10 is a section of the fixture support of Figure 9 taken along the line 10—10 of Figure 9.

Figure 11 is a view of the expansible end of the fixture support shown in Figure 9.

Figure 12 is a view of an expanding wedge utilized for expanding the fixture support to anchor it in a box hole.

Figure 13 shows the fixture support having four expansible sections which are expanded by a wedging expansion means.

Figure 14 is a view of the wedging means utilized for expanding the fixture support shown in Figure 13 in which the support is divided into four expansible arms.

The invention in its broad view consists of an expansible member which is inserted within a box hole opening provided for its reception in the outlet box and having means for expanding it within the box hole in order to firmly anchor the support therein. The manner of constructing the expansible member in order to secure its expansion is immaterial in the broader view of the invention and a substitute for the flexible expansible member to be described herein is a member having hinged arms which swing outwardly. Similarly there are many forms of construction whereby the expansion of the expansible member may be obtained in addition to those constructions which will be described. The lighting fixture may be attached to the fixture support in any desirable manner, and it is obvious that there are numerous ways available in which to attach a lighting fixture thereto and the form shown herein is illustrative only.

In the preferred form of construction the fixture support comprises a longitudinally split member providing flexible arms which may be expanded in any one of several ways to be described.

In the construction shown in Figure 1, the outlet box B is shown provided with the usual knockout holes H in the sides thereof for the introduction of conduit or electrical wiring into the outlet box and in addition a box hole H in the top thereof for the reception of the fixture support. The fixture support consists of the expansible member 1 rendered expansible by the slot 2 which extends longitudinally of the expansible member forming in this instance two flexible arms connected together at their lower end. It is clear however that the expansible member may have any number of arms as desired and Figure 4 shows a form where the member is slotted to provide four arms. As shown more clearly in Figure 5 a screw 3 is threaded axially at 4 within the expansible member and has a conical or wedging portion 5 at its end for engagement with the cooperating taper 6 in the flexible arms. Although both the screw and the expansible means are provided with cooperating tapers it is clear that one of these members only need be so provided with wedging means and the other need not necessarily have a taper to cooperate therewith.

The expansible member is provided at its expansible end with a groove 10 which receives the edge of the box hole H upon expansion of the member thereby securely locking the fixture support within the opening. This groove provides a shoulder for preventing the fixture support from being forcibly withdrawn from the box hole. This function may be performed by a simpler construction which consists merely of a pair of lugs or projections projecting from opposite sides of the end of the expansible member which affords a shoulder or means engaging a box hole edge to anchor the fixture support within the opening and prevent the support from being pulled through the box hole under the weight of the fixture. The expansible member need not even have the lugs but may be firmly anchored within the box hole by securing a sufficiently powerful expanding pressure to grip the edges of the box hole. This form of construction is only recommended for supporting lighting fixtures which are light in weight. The groove in the end of the expansible member, however is the preferred construction.

Although the expansible member may be expanded with sufficient force to firmly grip the edge of the box hole H and secure the fixture support against turning within the hole, means may, nevertheless, be provided to give assurance that turning of the fixture support will not occur. The horn 11 is therefore provided projecting outwardly from the expansible member and having its end turned upwardly for insertion within a small hole S provided therefor in the box for receiving the upwardly turned portion of the horn. The horn forms a positive means for preventing rotation of the fixture support within the box hole when it is being anchored within the box hole and also when the lighting fixture is being attached to the fixture support.

The insertion of the fixture support within the box hole may be more easily accomplished if the end of the flexible member is provided with a rounded shoulder 12. The manner in which this rounded shoulder assists in the insertion of the support within the box hole may be more readily observed from Figure 7 where the expansible member of the fixture support is shown with the box hole edge received in the groove 10 on one side of the member and the edge of the box hole contacting with the rounded corner on the other side of the expansible member so that the fixture support is tilted with respect to the box hole. The rounded corner serves as a wedging surface whereby the expansible member may be contracted by a pivoting or swinging movement of the fixture support against the box hole edge to insert the expansible end within the box hole.

The lower end of the fixture support is provided with means for attaching a lighting fixture thereto which preferably are screw threads 18 although it is to be understood that any other form of attaching means for securing the lighting fixture thereto may be utilized.

In the modified form of structure shown in Figure 8 the expansible member 1 instead of being merely slotted longitudinally as in the form shown in Figures 1 thru 7, the expansible member has a relatively wide opening 13, extending transversely therethrough, providing the expansible member with two flexible arms 14. This construction may also be described as a wide slot passing longitudinally of the expansible member or may be described as an expansible member having spaced flexible arms. Expanding means is provided in the screw 15 which is threaded in one of the arms and engages or contacts with the other arm whereby tightening of the screw separates or expands the arms of expansible member. Although the screw 15 is shown as being inserted at an angle to the axis of the member, the screw or expanding means may be at right angles to the axis of the expansible member as indicated by the screw shown in dot and dash lines. A passage 16 extends from the opening 13 to the end of the expansible member. In order to form a closure for the box hole with this type of fixture support the expansible end of the expansible member has, or the ends of the flexible arms have, a pair of flanges 17 extending towards and overlapping each other thereby permitting expansion of the flexible arms yet forming a closure for the end.

It will be observed therefore that in this form of fixture support, the support itself may serve as a hickey wherein the wires to the lighting fixture are carried through the opening 13 and down through the passage 16 into the structure, usually a pipe, supporting the lighting fixture from the screw threads 18 of the fixture support. In the form of support shown in Figure 1, a hickey must be provided at the end of the fixture support to which the pipe carrying the lighting fixture is attached. The hickey is a ring shaped structure having an axial passage from the center of the ring and provides a means whereby the electrical wires may be carried through the ring and passage into the lighting fixture supporting pipe as is well known in the art. The structure described and shown in Figure 8 is then a combination fixture support and hickey since it serves the two functions of a fixture support and of the hickey which must be provided with the support of Figure 1.

Another form of construction for expanding the flexible arms of the expansible member 1 is shown in Figures 9 to 12. In this construction the expansible member is split longitudinally at 2 and is provided with a groove 10 for anchoring the expansible end within the box hole opening as in the other forms previously described. A screw 3 is also provided axially of the member but instead of the screw directly engaging with the expansible end or flexible arms of the expansible member to cause expansion thereof, the screw is threaded within a wedge 20 which engages cooperating tapers 21 upon the arms of the expansible member. Upon rotation of the screw 3 the wedge 20 is drawn against the tapers of the flexible arms which expands the arms to anchor the groove 10 within the box hole opening.

In this construction, as in the form of fixture support in which the conical screw end directly engages the arms of the expansible member to expand it into the box hole opening, the wedge 20 alone may be tapered and engage a shoulder upon the expanding arms which need not be tapered, or tapers 21 may be provided upon each arm and instead of utilizing a tapered wedge 20 this member may be straight sided for engagement with the tapers 21. The preferred construction however is as shown in this figure where the wedge is tapered and cooperates with tapers on the arms of the expansible member. The screw in this construction is not threaded into the expansible member but passes freely through a central opening provided longitudinally of the expansible member.

The form of construction using the wedges 20 may also be provided or not with the horn 11 as desired and for this reason Figure 9 shows the fixture support without such horn and Figure 11 shows the horn provided on the member for insertion within one of the holes S in the outlet box to hold the fixture support against rotation.

Figures 13 and 14 show the manner in which the wedging construction of Figure 9 may be adapted for an expansible member which is split longitudinally with two slots dividing the member into four flexible arms. In this form the wedging member 24 is square in form and tapered on all four sides for cooperation with each arm of the expansible member. The horn 11 and the groove 10 may also be provided as in the other forms. Similarly the expansible member may have three or in fact any number of arms as desired.

Having described my invention it is to be understood that I do not limit myself to the preferred structures described herein excepting as defined by the accompanying claims and contemplate any modifications which may be made within the scope of my invention.

What is claimed is:—

1. A fixture support for insertion within a box hole comprising a member split longitudinally from one end forming flexible arms at its end, a screw threaded in one arm and engaging another arm to expand the end of the member and means for attaching a lighting fixture to the member.

2. A fixture support for insertion within a box hole comprising a member having expansible arms widely separated to provide a transverse opening therebetween, an axial passage through the member connecting the transverse opening with the end of the member, means for expanding said arms, and means for attaching a lighting fixture to the member.

3. A fixture support for insertion within a box hole comprising a member having expansible arms widely separated to provide a transverse opening therebetween, an axial passage through the member connecting the transverse opening with the end of the member, means for expanding said arms, means to close the expansible end of the member, and means for attaching a lighting fixture to the member.

4. A fixture support for insertion within a box hole comprising a member having expansible arms widely separated to provide a transverse opening therebetween, an axial passage through the member connecting the transverse opening with the end of the member, means for expanding said arms, a flange on each arm overlapping the other to close the expansible end of the member and means for attaching a lighting fixture to the member.

5. A fixture support for insertion within a box hole comprising a member having expansible arms widely separated to provide a transverse opening therebetween, an axial passage through the member connecting the transverse opening with the end of the member, a screw threaded in one arm and abutting the other to expand the arms, and means for attaching a lighting fixture to the member.

6. A fixture support for insertion within a box hole comprising a member having expansible arms widely separated to provide a transverse opening therebetween, an axial passage through the member connecting the transverse opening with the end of the member, a groove at the expansible end of the member to receive the edge of the box hole, a screw threaded in one arm and abutting the other to expand the arms, and means for attaching a lighting fixture to the member.

7. A fixture support for insertion within a box hole comprising a member split longitudinally from one end forming flexible arms at its end, a screw threaded in one arm and abutting the other arm to expand the end of the member, a circumferential groove at the expansible end, and means for attaching a lighting fixture to the member.

8. An outlet box assembly comprising an outlet box having a box hole therein, a fixture support for insertion in the box hole, including a member split longitudinally from one end forming a flexible end therefor, a groove at the flexible end to receive the edge of the box hole, means to expand the flexible end of the member to anchor the edge of the box hole in the groove, and means to attach a lighting fixture to the member.

9. An outlet box assembly comprising an outlet box having a box hole therein, a fixture support for insertion in the box hole, including a member split longitudinally from one end forming a flexible end therefor, the end of the member being normally larger than the box hole and insertable therein by contracting the flexible end, a groove at the flexible end to receive the edge of the box hole, means engaging the flexible end and holding it against contraction, and means to attach a lighting fixture to the member.

10. An outlet box assembly comprising an outlet box having a box hole therein, a fixture support for insertion in the box hole, including a member split longitudinally from one end forming one flexible end and one rigid end therefor, a shoulder upon the flexible end to abut against the box wall, the shoulder being normally larger than the box hole and insertable therein by contracting the flexible end, means engaging the flexible end and holding it against contraction, the rigid end projecting from the box hole, and means upon the rigid end of the member to attach a lighting fixture thereto.

In testimony whereof I affix my signature.
STEPHEN N. BUCHANAN.